United States Patent [19]

Nakao et al.

[11] Patent Number: 5,168,715
[45] Date of Patent: Dec. 8, 1992

[54] COOLING APPARATUS AND CONTROL METHOD THEREOF

[75] Inventors: Masaki Nakao; Kazuo Ohshima, both of Tokyo; Tsuneo Uekusa, Chiba, all of Japan

[73] Assignee: Nippon Telegraph and Telephone Corp., Tokyo, Japan

[21] Appl. No.: 620,374

[22] Filed: Nov. 29, 1990

Related U.S. Application Data

[63] Continuation of Ser. No. 233,562, Aug. 18, 1988, abandoned.

[30] Foreign Application Priority Data

Jul. 20, 1987 [JP] Japan .................................. 62-180276

[51] Int. Cl.⁵ ............................................. F25B 39/04
[52] U.S. Cl. ................................. 62/181; 62/184; 62/196.4; 62/204; 62/206; 62/225; 62/DIG. 17
[58] Field of Search ................. 62/117, 204, 205, 206, 62/210, 212, 222, 224, 225, 196.4, 181, 183, 184, DIG. 17

[56] References Cited

U.S. PATENT DOCUMENTS

| | | | |
|---|---|---|---|
| 4,136,528 | 1/1979 | Vogel et al. | 62/196.4 X |
| 4,193,781 | 3/1980 | Vogel et al. | 62/DIG. 17 |
| 4,499,739 | 2/1985 | Matsuoka et al. | 62/225 X |

Primary Examiner—Harry B. Tanner
Attorney, Agent, or Firm—Blakely Sokoloff Taylor & Zafman

[57] ABSTRACT

A cooling apparatus includes a bypass provided to a path extending from a compressor to an expansion valve via a condenser, and a unit for controlling a ratio of a flow rate of a refrigerant of the path via the condenser to that of the bypass path, or a unit for varying an air volume of a fan of an outdoor unit for blowing the condenser so as to vary a capacity of the condenser. The degree of superheat of the refrigerant is measured at an exit of the evaporator, and an expansion valve is controlled in accordance with the measured degree of superheat.

11 Claims, 14 Drawing Sheets

COOLING APPARATUS AND CONTROL METHOD THEREOF

This is a continuation of application Ser. No. 233,562, filed Aug. 18, 1988, abandoned.

BACKGROUND OF THE INVENTION

The present invention relates to a cooling apparatus for performing cooling throughout the year and a control method therefor and, more particularly, to a control method when an outside temperature is low.

FIG. 1 shows a basic arrangement of a cooling apparatus. A refrigeration cycle is mainly constituted by four components, i.e., a compressor 121, a condenser 122, an expansion valve 123, and an evaporator 124. In an air cooling type air conditioner, an evaporator is installed indoors, and a condenser is installed outdoors. A refrigerant is sealed in the refrigeration cycle, and the refrigerant is circulated among the components, so that indoor heat can be exhausted outside a room.

The function of this refrigeration cycle will be explained below. In the evaporator 124, a low-pressure refrigerant liquid takes indoor heat away and is evaporated to be a gas. The refrigerant gas vaporized in the evaporator is sent to the compressor 121, and is compressed to a high-temperature, high-pressure gas. The obtained gas is supplied to the condenser 122. In the condenser, heat is exhausted to outer air in an opposite way to the evaporator, thus converting the gas into a high-pressure liquid. The high-pressure liquid is supplied to the expansion valve 123, and is expanded to a low-temperature, low-pressure liquid. The obtained liquid is supplied again to the evaporator. In this manner, this cycle is repeated. More specifically, upon operation of the compressor, the refrigerant gas having a lower saturation temperature than a room temperature is compressed to a gas having a higher saturation temperature than that of outer air, thereby exhausting indoor heat outside a room.

However, when an outside temperature is low, if the cooling apparatus shown in FIG. 1 is operated as in a case wherein an outside temperature is high, exchange heat of the condenser is enhanced, and a condensing pressure as a refrigerant pressure in the condenser is decreased. When the condensing pressure is decreased, an evaporative pressure as a refrigerant pressure in the evaporator is decreased accordingly. As a result, the evaporator is frosted, or is operated under an over-dehumidified condition. If the compression power in the compressor is decreased so that the evaporative pressure is not decreased even if the condensing pressure is decreased, the flow rate of the refrigerant circulating in the refrigeration cycle is decreased. As a result, a cooling capacity is decreased or a degree of superheat is increased.

In order to eliminate the above problems, in the conventional apparatus, a bypass is arranged along a path extending from the compressor to the expansion valve, and a condensing pressure control valve 226 in FIG. 2 is arranged at a merging point of the bypass and a path via the condenser. The condensing pressure control valve is a three-way valve in which a predetermined pressure of a gas is sealed. When the condensing pressure is decreased, the control valve automatically open the valve of the bypass, so that the condensing pressure is increased up to a value as high as that when the outside temperature is high. In this manner, the control valve can prevent the evaporative pressure and the cooling capacity from being decreased.

However, when the outside temperature is low, since a pressure difference between the condensing pressure and the evaporative pressure can be small, this method loses an opportunity of a low-compression power operation of the cooling apparatus. In this method, the condensing pressure is increased to increase the pressure difference between the condensing pressure and the evaporative pressure, thereby increasing compression power to operate the apparatus, resulting in a noneconomical operation method.

If the problem of the operation of the cooling apparatus shown in FIG. 1 at a low outside temperature is solved in view of keeping a sufficient refrigerant circulation amount, a method of increasing the maximum valve lift of the expansion valve 123 may be employed. The method of increasing the valve lift of the expansion valve includes a method of arranging a plurality of expansion valves parallel to each other, or a method of mounting an expansion valve having a capacity larger than a conventional value (e.g., an expansion valve for a cooling capacity of 10 RT (ton of refrigeration) is attached to an air conditioner of a cooling capacity of 5 RT). Note that "RT" is a unit indicating a cooling capacity of the cooling apparatus, and 1 RT = 3,320 kcal/h. When the valve lift of the expansion valve is increased, the low condensing pressure state is maintained, and an operation with low compression power in the compressor is allowed.

However, in this operation method, the valve lift of the expansion valve is limited. If the number of expansion valves is increased too much (three or four valves are mounted), or if an expansion valve having an excessively large capacity (e.g., an expansion valve for 15 RT is attached to an air conditioner of a cooling capacity of 5 RT) is used, superheat control cannot be accurately performed when the condensing pressure is high. Thus, this method also has a limitation. When an outside temperature is decreased, the condensing pressure is excessively decreased. Even if the expansion valve is fully opened, the refrigerant circulation amount is decreased, and the degree of superheat is undesirably increased.

SUMMARY OF THE INVENTION

The present invention has been made to improve the poor efficiency of the prior art caused such that an air conditioner is operated while compression power is increased to a value as high as that when an outside temperature is high even when the outside temperature is low, and has as its object to provide an economical cooling apparatus with small compression power, and a control method therefor.

The present invention relates to a cooling apparatus for performing cooling throughout the year, wherein in order to allow an economical operation of the cooling apparatus with small compression power, a bypass is provided to a path extending from a compressor to an expansion valve via a condenser, and a means for controlling a ratio of a flow rate of a refrigerant of the path via the condenser to that of the bypass path is arranged, or a means for varying an air volume of a fan of an outdoor unit for blowing the condenser is arranged so as to vary a capacity of the condenser.

In a fundamental operation, the degree of superheat of the refrigerant is measured at an exit of the evaporator, and an expansion valve is controlled in accordance with the measured degree of superheat. However, even if the expansion valve is fully opened, when a pressure difference between the condensing pressure and the evaporative pressure is small so that the flow rate of the refrigerant circulating the refrigeration cycle is decreased and the degree of superheat is increased, the condensing pressure is controlled by the means in accordance with a difference between a preset degree of superheat and the measured degree of superheat, thereby controlling the degree of superheat.

When the condensing pressure is decreased and a compression ratio as a ratio of a delivery pressure to a suction pressure of the compressor becomes lower than an allowable minimum compression ratio of the compressor, the condensing pressure is increased to a minimum pressure which exceeds the allowable minimum compression ratio.

Unlike in the prior art, a low condensing pressure at a low outside temperature is effectively utilized, and an economical operation with small compression power can be achieved.

DESCRIPTION OF THE PREFERRED EMBODIMENTS

Embodiments of the present invention will be described hereinafter with reference to the accompanying drawings.

Figure 3:
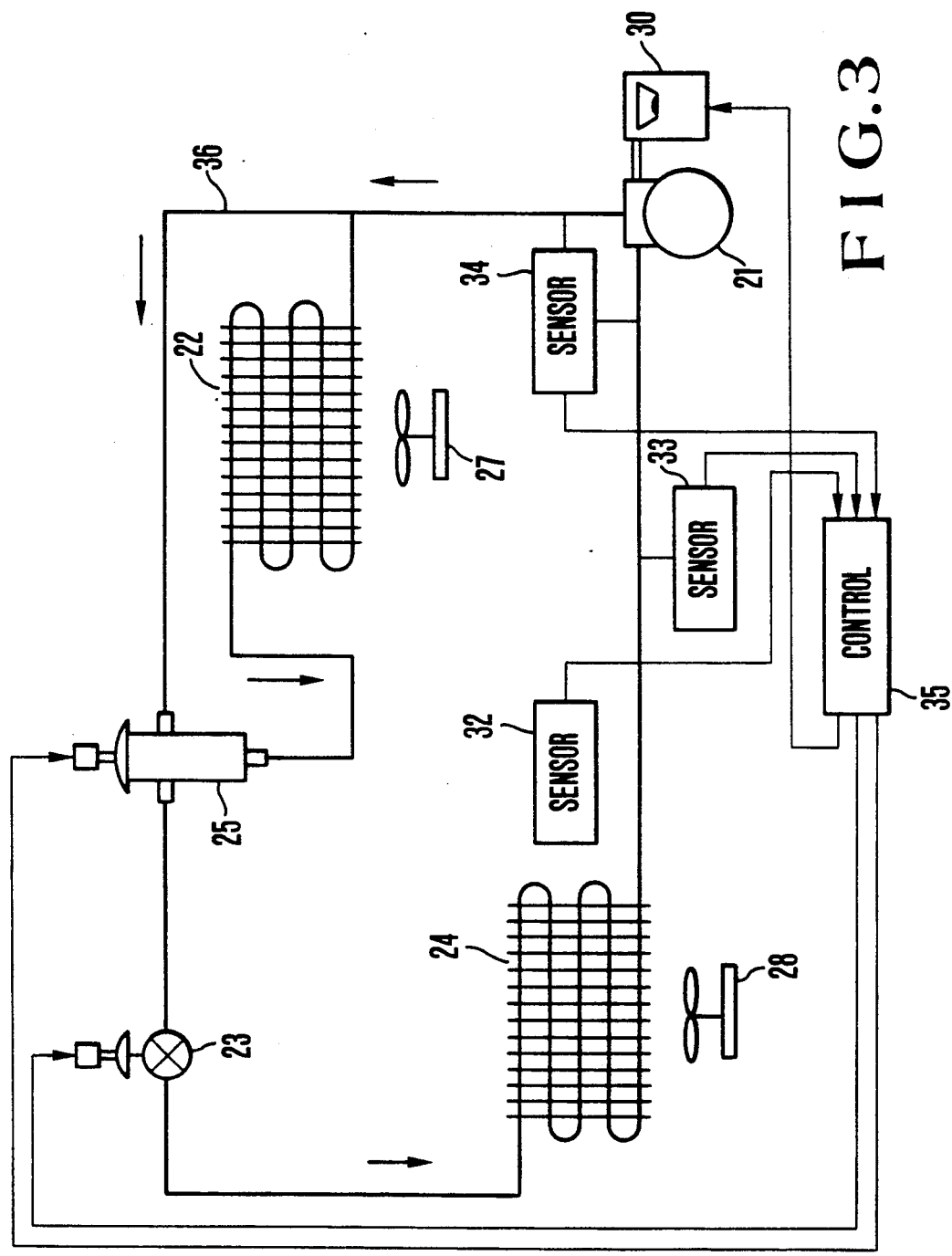
FIG. 3 is a diagram showing a cooling apparatus according to an embodiment of the present invention, which employs a variable setting pressure type condensing pressure control valve as a condensing pressure control device.

FIG. 3 shows an embodiment of a cooling apparatus using a variable setting pressure type condensing pressure control valve 25. More specifically, the cooling apparatus includes a compressor 21 having a rotational speed control means 30, a condenser 22, a fan 27 of an outdoor unit for blowing the condenser, an evaporator 24, a fan 28 of an indoor unit for blowing the evaporator 24, a path for guiding a refrigerant delivered from the compressor 21 via the condenser 22, a bypass path 36 for guiding the refrigerant while bypassing the condenser 22, a variable setting pressure type condensing pressure control valve 25 arranged at a merging point between both the paths as a means for controlling the flow rates of both the paths, a path for guiding the refrigerant flowing out from the control valve 25 toward the evaporator, an expansion valve 23 arranged between the control valve 25 and the evaporator 24, and a path for returning the refrigerant flowing out from the evaporator toward the compressor. This apparatus comprises a compression ratio sensor 34 for detecting a ratio of a delivery pressure of the compressor 21 to a suction pressure, a superheat sensor 33 for detecting a degree of superheat at a suction port of the compressor 21, and a control unit 35 for performing an arithmetic operation of two signals, i.e., a signal from the compression ratio sensor 34 and a superheat signal from the superheat sensor 33, and for supplying a control signal to the expansion valve 23 and the control valve 25. Note that reference numeral 32 denotes a room temperature detecting means.

Figure 9:
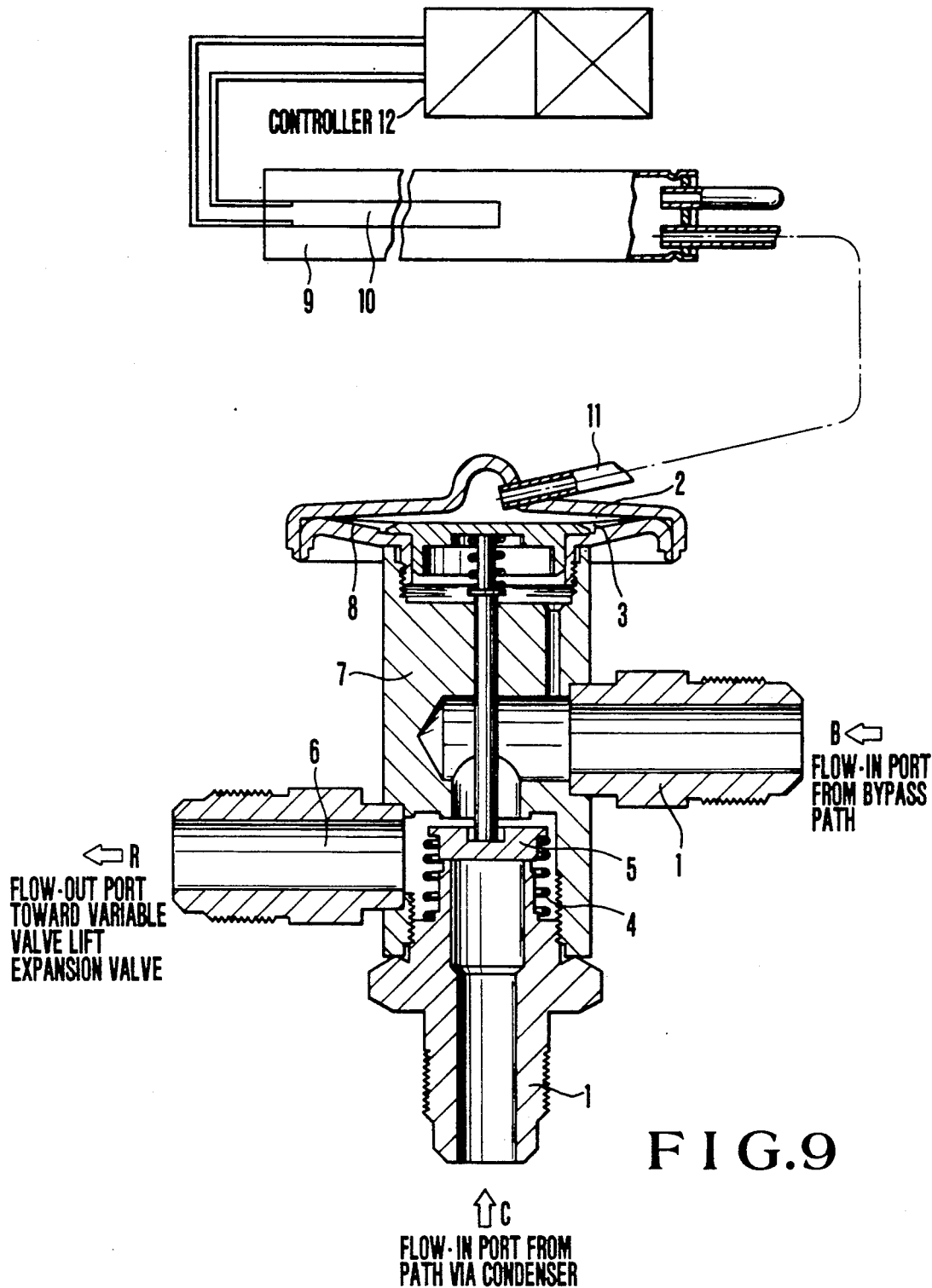
FIG. 9 is a sectional view showing an arrangement of a variable setting pressure type condensing pressure control valve.

FIG. 9 shows an arrangement of the variable setting pressure type condensing pressure control valve 25. Reference numeral 1 denotes a refrigerant entrance; 2, a diaphragm inner chamber; 3, a diaphragm outer chamber; 4, a spring; 5, a valve portion; 6, a refrigerant exit; 7, a main body; 8, a diaphragm; 9, a feeler bulb; 10, a heater; 11, a conduit; and 12, a controller for controlling the heater based on a control signal from the control unit. Reference symbol B denotes a flow-in port from the bypass path 36; C, a flow-in port from the path via the condenser 22; and R, a flow-out port toward the expansion valve 23. The diaphragm inner chamber 2 communicates with the feeler bulb 9 through the conduit 11. A liquid-gas mixture, a pressure of which is changed in accordance with temperatures, is sealed in the cylinder 9. When the heater 10 embedded in the cylinder 9 is energized, the temperature of the gas is increased, and as a result, the pressure in the diaphragm inner chamber 2 is increased. Therefore, when electric power to the heater 10 is increased/decreased, the pressure in the diaphragm inner chamber 2 can be desirably controlled, and hence, the pressure in the condenser 22 can be desirably controlled. For example, when a condensing pressure is excessively decreased because of a low outside temperature and must be increased, electric power to the heater 10 is increased, so that the valve portion 5 closes the flow-in port C from the path via the condenser 22, and opens the flow-in port B from the bypass path. When the C-R circuit is closed, the refrigerant liquid is stored in the condenser 22 to decrease an effective area of the condenser 22, thereby increasing the condensing pressure. When the condensing pressure is increased and exceeds a preset pressure, the valve portion 5 is moved upward to open the C-R circuit and to close the B-R circuit. In this manner, the energization amount of the heater 10 is controlled, so that the condensing pressure can be set to be an arbitrary value.

Figure 4:
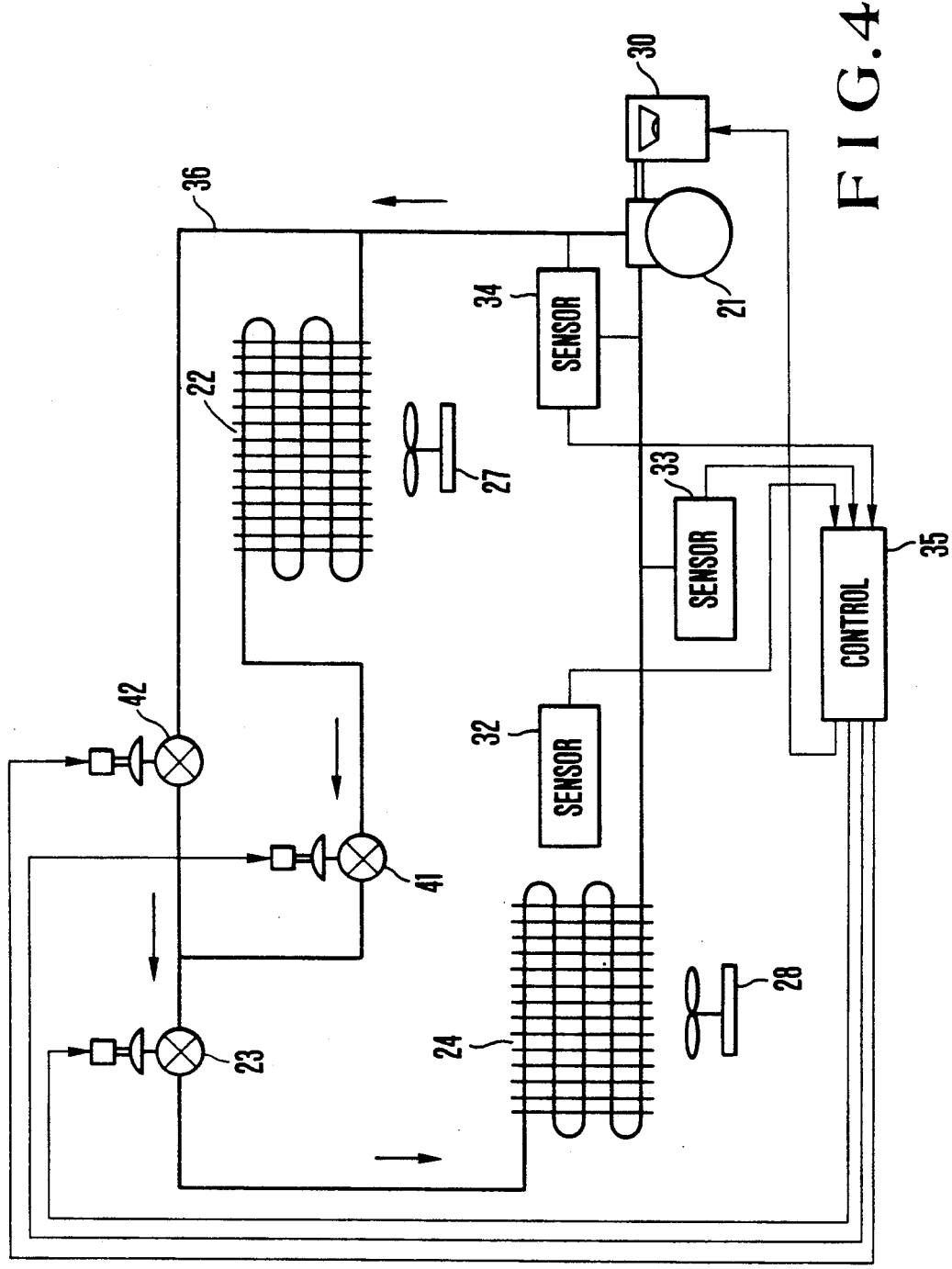
FIG. 4 is a diagram showing a cooling apparatus according to another embodiment of the present invention, which employs two control valves as the condensing pressure control device.

FIG. 4 shows an embodiment of the cooling apparatus using first and second control valves 41 and 42. In this embodiment, control made for the variable setting pressure type condensing pressure control valve 25 in the embodiment shown in FIG. 3 is made for the first and second control valves 41 and 42.

Figure 5:
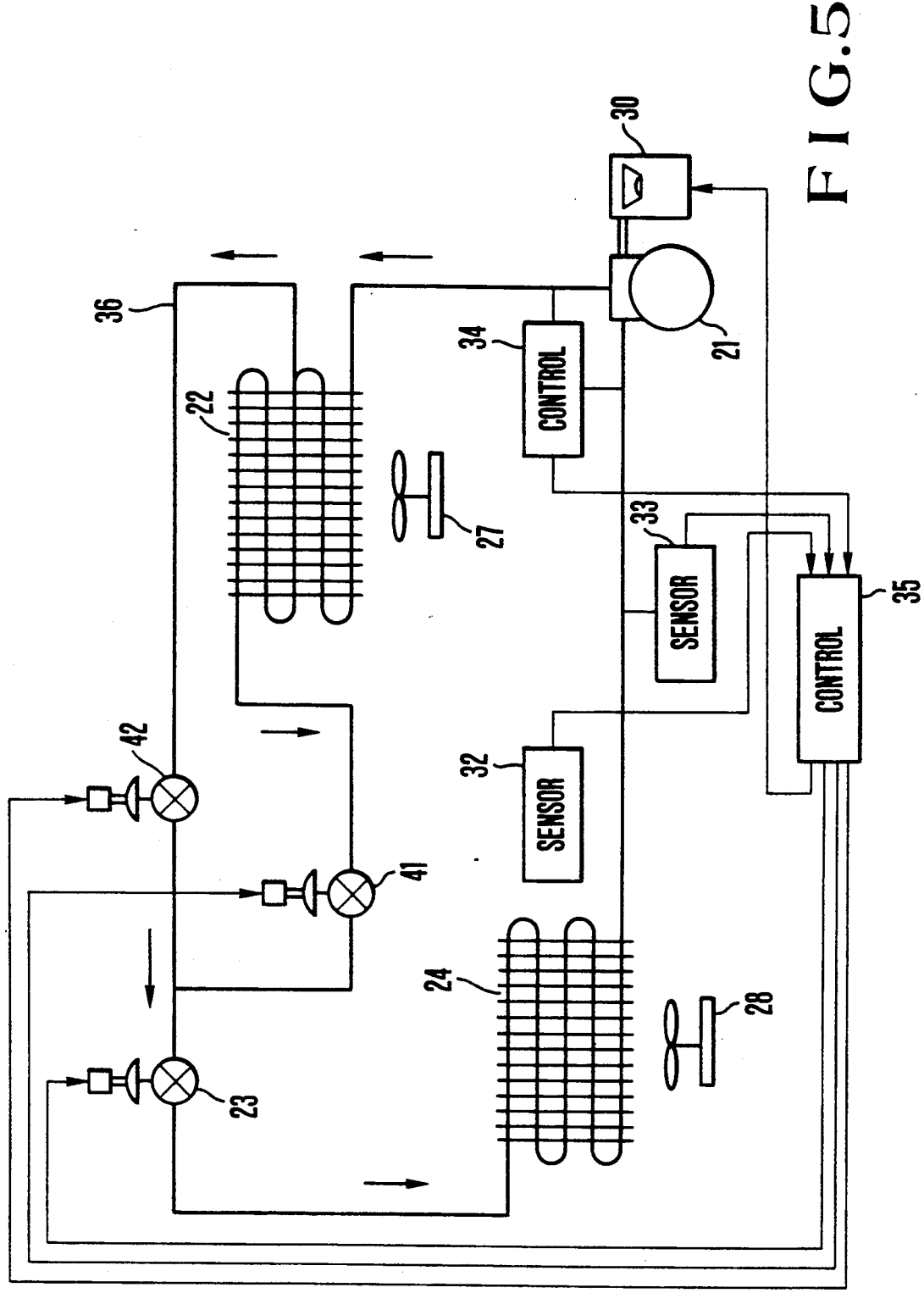
FIG. 5 is a diagram showing a cooling apparatus according to still another embodiment of the present invention, which employs both the condensing pressure control devices shown in FIGS. 3 and 4 and in which a bypass extends from a portion midway along a condenser.
Figure 6:
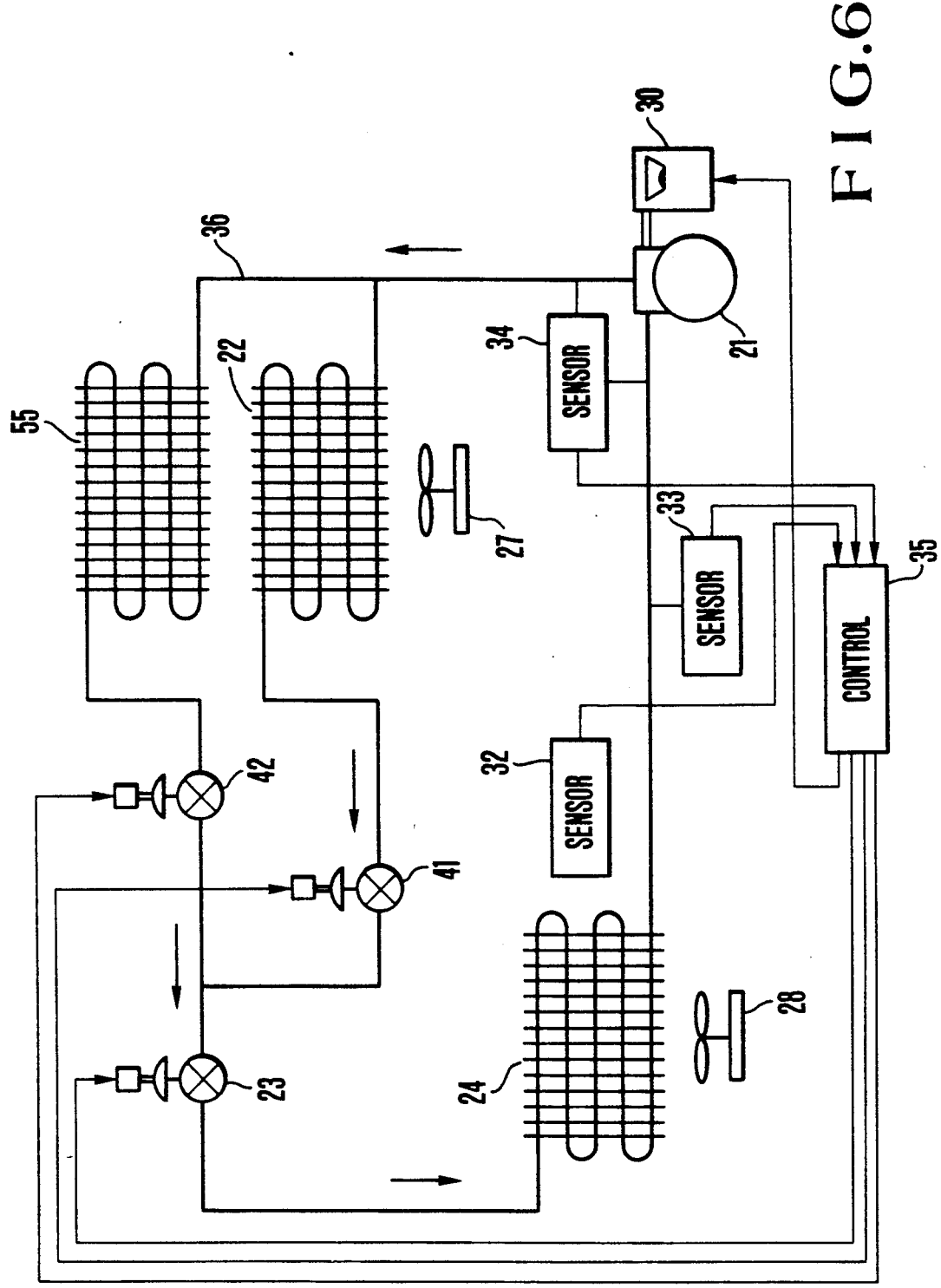
FIG. 6 is a diagram showing a cooling apparatus according to still another embodiment of the present invention, which employs both the condensing pressure control devices shown in FIGS. 3 and 4 and in which a bypass portion performs heat exchange as a condenser.
Figure 7:
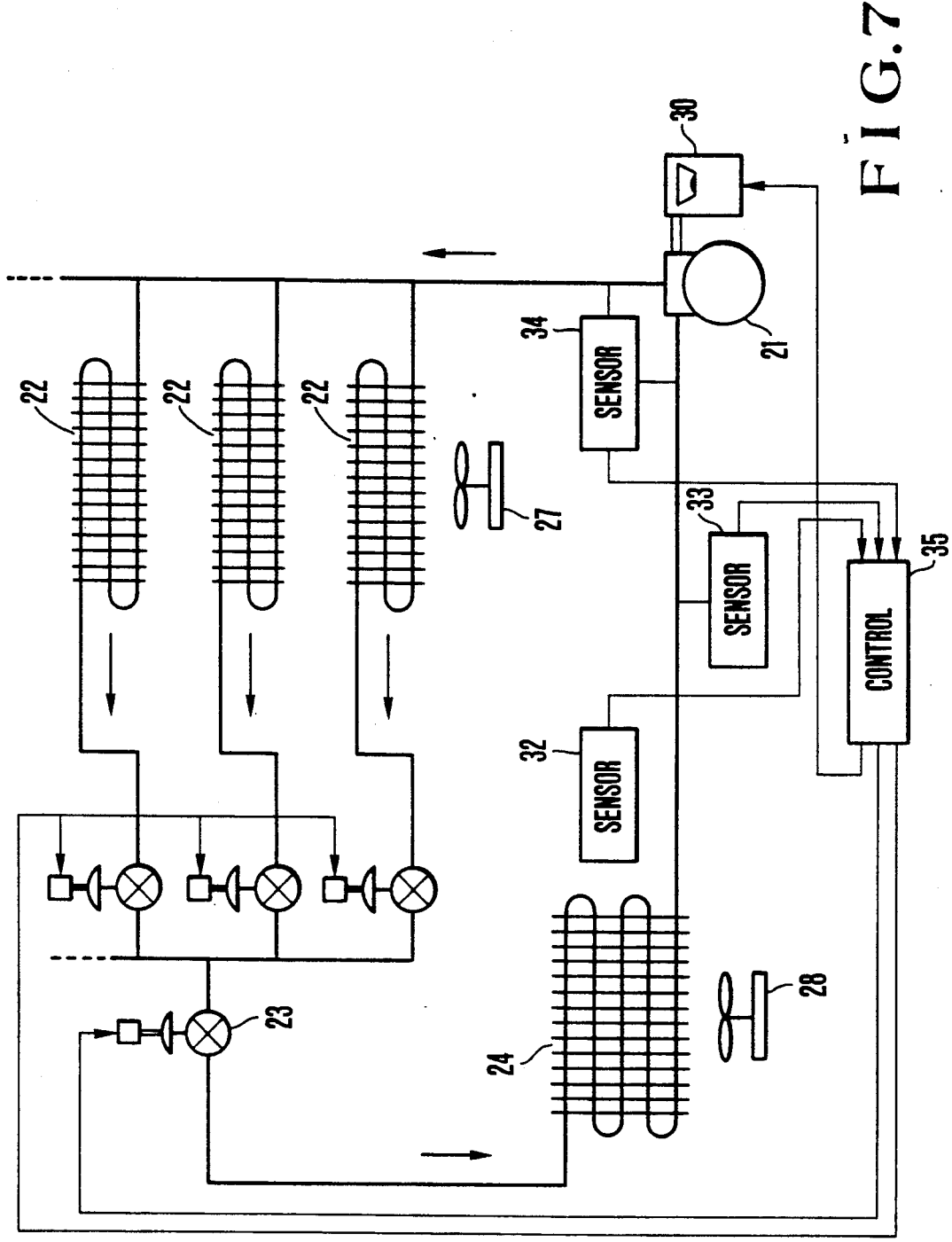
FIG. 7 is a diagram showing a cooling apparatus according to still another embodiment of the present invention, which employs both the condensing pressure control devices shown in FIGS. 3 and 4 and in which a plurality of bypasses for performing heat exchange as a condenser are arranged.

In the embodiments shown in FIGS. 3 and 4, the bypass path extends from the entrance of the condenser 22. FIG. 5 shows an embodiment wherein the bypass path extends from a midway along the condenser. FIG. 6 shows an embodiment wherein the bypass path portion serves as a second condenser 55 for performing heat exchange. FIG. 7 shows an embodiment wherein a plurality of bypass paths serving as condensers for performing heat exchange are arranged, and a control valve is arranged for each path. The arrangements shown in FIGS. 3 to 7 can be desirably selected in accordance with the scale, installation conditions of the cooling apparatus and the like.

Figure 8:
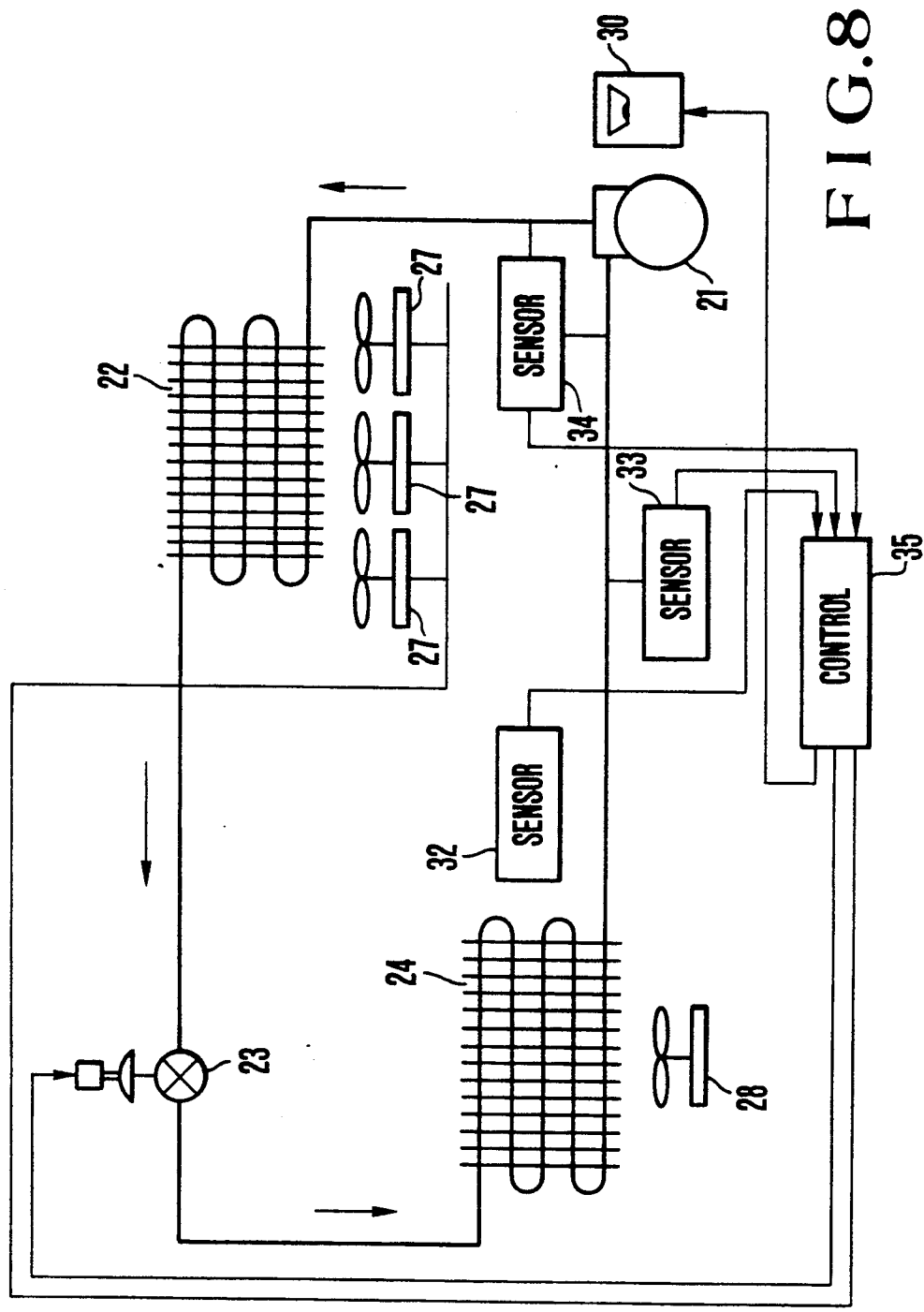
FIG. 8 is a diagram showing a cooling apparatus according to still another embodiment of the present invention, which employs variable rotational speed fans of an outdoor unit as a condensing pressure control device.

FIG. 8 shows an embodiment of the cooling apparatus which employs a plurality of independently controllable fans 27 of an outdoor unit. In this embodiment, control made for the variable setting pressure type condensing pressure control valve 25 in the embodiment shown in FIG. 3 is made for the fans 27. The fans 27 can be replaced with one or a plurality of variable rotational speed fans.

The six embodiments have been explained above. That is, any arrangement may be adopted as long as a condensing pressure can be controlled at a low outside temperature. An arrangement which comprises both a variable setting pressure type variable valve lift condensing pressure control valve and a variable rotational speed fan of an outdoor unit may be adopted.

A method of controlling a cooling apparatus according to the present invention will be described hereinafter. When an outside temperature is low, in the operation method of the present invention, a condensing pressure is left to take its own course, and the valve lift of the expansion valve 23 is increased as large as possible, thereby controlling the degree of superheat. The method of increasing the valve lift of the expansion valve 23 includes a method of arranging a plurality of expansion valves parallel to each other, or a method of mounting an expansion valve having a capacity larger than a conventional value (e.g., an expansion valve for a cooling capacity of 10 RT is attached to an air conditioner of a cooling capacity of 5 RT). When the valve lift of the expansion valve 23 is increased, a low condensing pressure state is maintained, and as a result, an operation of the compressor 21 with low compression power is allowed. However, this operation method has the following drawbacks:

(1) Since the valve lift of the expansion valve 23 is limited, if the number of expansion valves is increased too much (three or four valves are arranged), or if an expansion valve having an excessive capacity is used (an expansion valve for 15 RT is attached to an air conditioner of a cooling capacity of 5 RT), the degree of superheat cannot be accurately controlled, and this method has a limitation.

(2) The compressor 21 has an allowable minimum compression ratio in view of a refrigeration machine oil. For these reasons, when an outside temperature is decreased below about 10° C., the following problems occur:

(1) The condensing pressure is excessively decreased, and even if the expansion valve 23 is fully opened, a refrigerant circulation amount is decreased, and the degree of superheat is increased.

(2) A compression ratio of a delivery pressure to a suction pressure is decreased below an allowable minimum compression ratio of the compressor 21.

In order to avoid the above situation, the condensing pressure must be inevitably increased. However, since the condensing pressure control valve used in the conventional apparatus can set only a constant condensing pressure, the condensing pressure is unnecessarily increased if this valve is used without modifications, and compression power is increased. According to the present invention, a means for varying a condensing pressure is arranged to perform the following control.

Figures 10A, 10B:
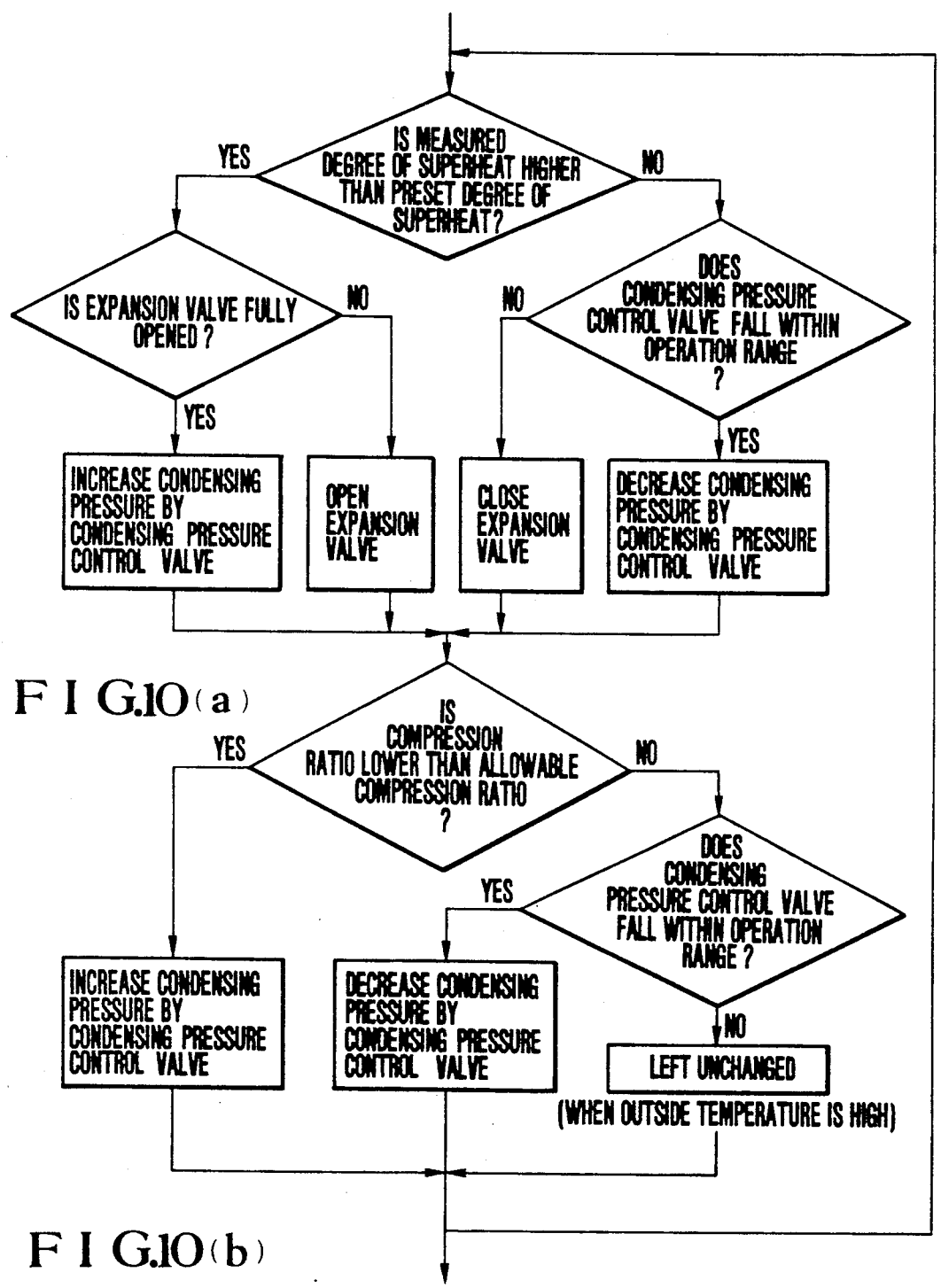
FIGS. 10(a) and 10(b) are a flow chart showing an operation of the cooling apparatus according to the present invention, which employs the variable setting pressure type compression pressure control valve as the condensing pressure control device.

The operation method in the refrigeration cycle shown in FIG. 3 will be described below with reference to the flow charts shown in FIGS. 10(a) and 10(b).

First, the degree of superheat is controlled. The degree of superheat is measured by the superheat sensor 33, and is compared with a preset degree of superheat. In a first process, if the measured degree of superheat is higher than the preset degree of superheat, the expansion valve 23 is opened in accordance with a difference therebetween in the same as in normal superheating control. In contrast to this, if the measured degree of superheat is lower than the preset degree of superheat, the expansion valve 23 is closed in accordance with a difference therebetween. However, in a second process, when an outside temperature is decreased and a condensing pressure is decreased accordingly and when the measured degree of superheat is higher than the preset degree of superheat (Y) and the expansion valve 23 is fully opened (Y), the valve lift of the variable valve lift condensing pressure control valve 25 is controlled in accordance with the difference between the measured and preset degrees of superheat so as to increase a flow rate of the refrigerant flowing through the bypass path. Thus, the condensing pressure is increased and the degree of superheat is decreased. Contrary to this, when the measured degree of superheat is lower than the preset degree of superheat (N) and when the variable setting pressure type condensing pressure control valve 25 is operated (Y) to cause the refrigerant to flow toward the bypass path so as to increase the condensing pressure, the valve lift of the control valve 25 is controlled in accordance with the difference between the measured and preset degrees of superheat so as to decrease the flow rate of the refrigerant flowing through the bypass path. Thus, the condensing pressure is decreased and the degree of superheat is increased. With this method, even when the degree of superheat cannot be controlled by the expansion valve 23, it can be controlled by the control valve 25.

The fundamental control operation has been described above. If the following problem of the compression ratio of the compressor occurs after the above-mentioned control operation, the following control is made.

A compression ratio of the delivery pressure to the suction pressure of the compressor 21 is detected by the compression ratio sensor 34, and is compared with the stored allowable minimum compression ratio. If the measured compression ratio is lower than the allowable minimum compression ratio (Y), the valve lift of the control valve 25 is controlled in accordance with a difference between the measured compression ratio and the allowable minimum compression ratio so as to increase the flow rate of the refrigerant flowing through the bypass path. As a result, the condensing pressure is increased so that the compression ratio is increased to be higher than the allowable minimum compression ratio. However, if the measured compression ratio is higher than the allowable minimum compression ratio (N) but is too higher, for example, when a compression ratio is increased to 3.0 although the allowable minimum compression ratio is 2.0, compression power becomes too large, resulting in a noneconomical operation. Thus, when the measured compression ratio is higher than the allowable minimum compression ratio, the valve lift of the control valve 25 is controlled in accordance with the difference therebetween so as to decrease the flow rate of the refrigerant flowing through the bypass path. As a result, the condensing pressure is decreased, so that the cooling apparatus is always operated at a compression ratio near the allowable minimum compression ratio. When the outside temperature is high and the control valve 25 does not need to work (N), the control valve lift is left unchanged.

This control operation is necessary only when the compressor can be operated at a certain constant compression ratio or more. If this problem is solved in the compressor, this control operation is unnecessary.

The room temperature sensor 32 shown in FIGS. 3 to 8 compares a room temperature and a preset temperature, and the difference therebetween is fed back to the rotational speed control means 30 of the compressor 21 through the control unit 35. More specifically, if the room temperature is higher than the preset temperature, the rotational speed of the compressor 21 is increased; otherwise, it is decreased. Such control is performed in the conventional cooling apparatus.

Figure 11A:
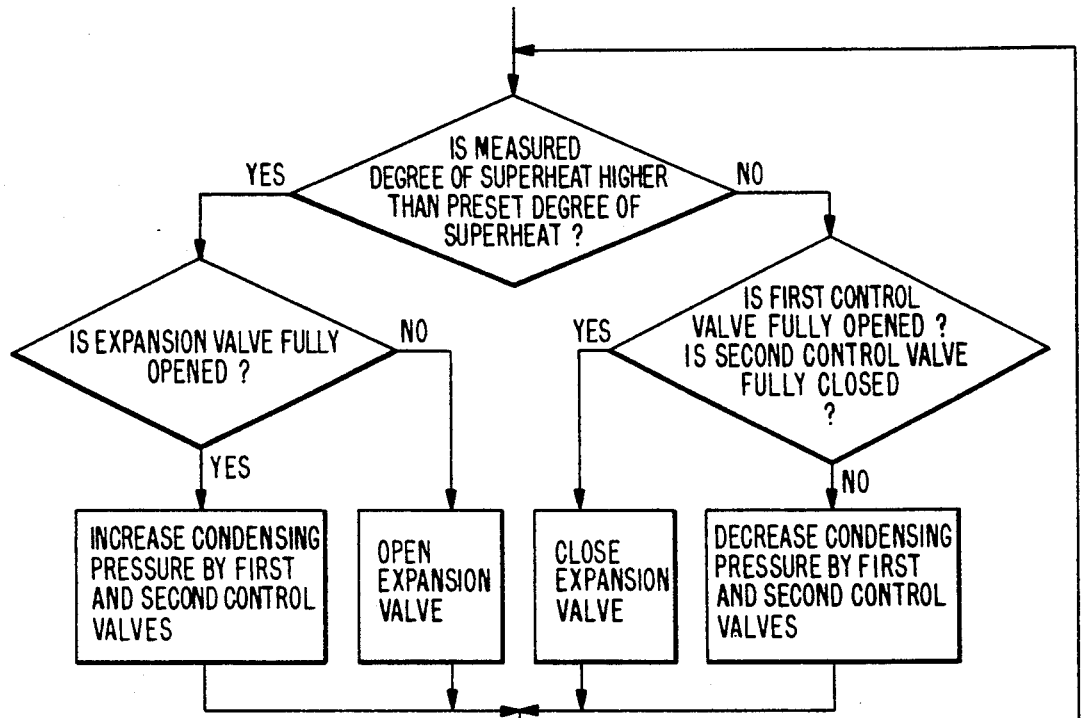
FIGS. 11(a) and 11(b) are a flow chart showing an operation of the cooling apparatus according to the present invention which employs two control valves as the condensing pressure control device.
Figure 11B:
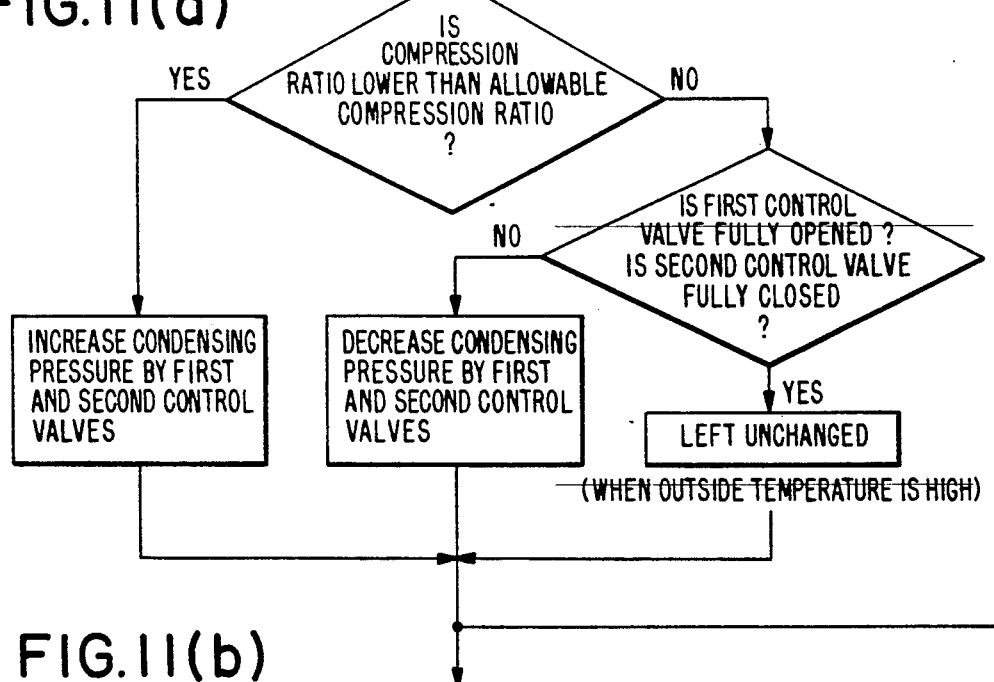

The operation method in the arrangement shown in FIG. 4 will be described below with reference to the flow charts shown in FIGS. 11(a) and 11(b).

Control in the first process is the same as that in the control method of the arrangement shown in FIG. 3. In a second process, if the measured degree of superheat is higher than the preset degree of superheat (Y) and the expansion valve 23 is fully opened (Y), the valve lifts of the first and second control valves 41 and 42 are controlled in accordance with a difference between the measured and preset degrees of superheat so as to increase the flow rate of the refrigerant flowing through the bypass path. Thus, the condensing pressure is increased and the degree of superheat is decreased. With this method, even when the degree of superheat cannot be controlled by the expansion valve 23, the degree of superheat can be controlled by the first and second control valves 41 and 42.

The control operation of the compression ratio is the same as that in the control method of the arrangement shown in FIG. 3. If the measured compression ratio is lower than the allowable minimum compression ratio (Y), the valve lifts of the first and second control valves 41 and 42 are controlled in accordance with the difference between the measured compression ratio and the allowable minimum compression ratio so as to increase the flow rate of the refrigerant flowing through the bypass path. Thus, the condensing pressure is increased, so that the compression ratio is increased to be higher than the allowable minimum compression ratio. However, if the measured compression ratio is higher than the allowable minimum compression ratio (N) but is too high, for example, when a compression ratio is increased to 3.0 although the allowable minimum compression ratio is 2.0, compression power becomes too high, resulting in a noneconomical operation. Thus, when the measured compression ratio is higher than the allowable minimum compression ratio, the valve lifts of the first and second control valves 41 and 42 are controlled in accordance with the difference therebetween so as to decrease the flow rate of the refrigerant flowing through the bypass path. As a result, the condensing pressure is decreased, so that the cooling apparatus is always operated at a compression ratio near the allowable minimum compression ratio.

When the outside temperature is high, the first control valve 41 is fully opened, and the second control valve 42 is completely closed.

Figure 12A:
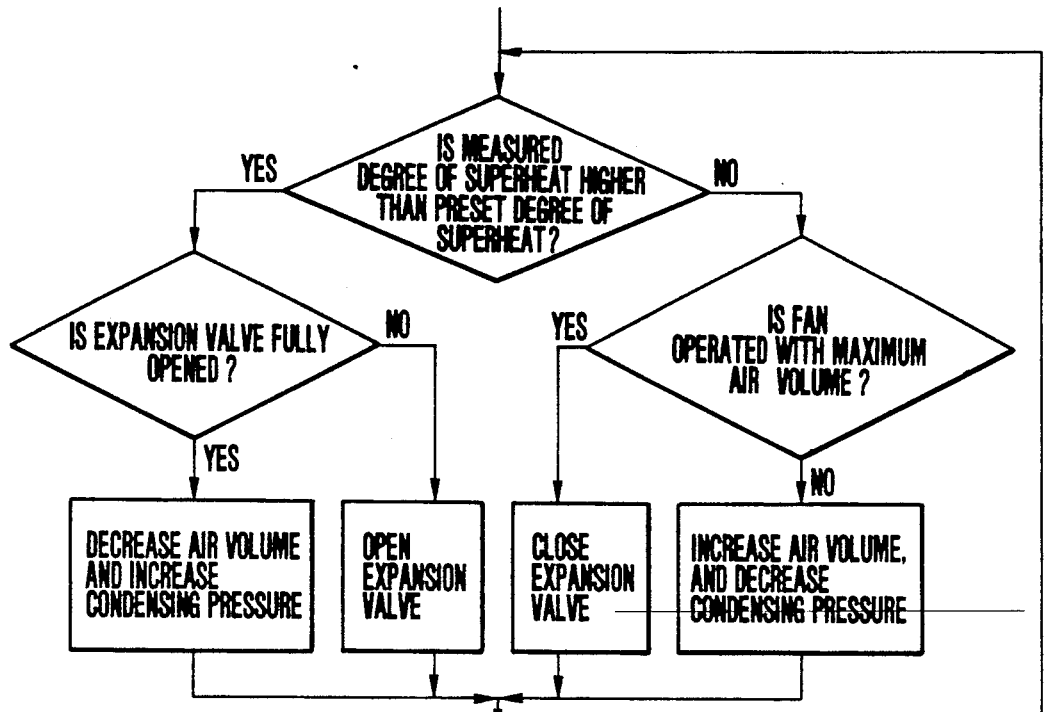
FIGS. 12(a) and 12(b) are a flow chart showing an operation of the cooling apparatus according to the present invention, which employs the variable rotational speed fan of the outdoor unit as the condensing pressure control device.
Figure 12B:
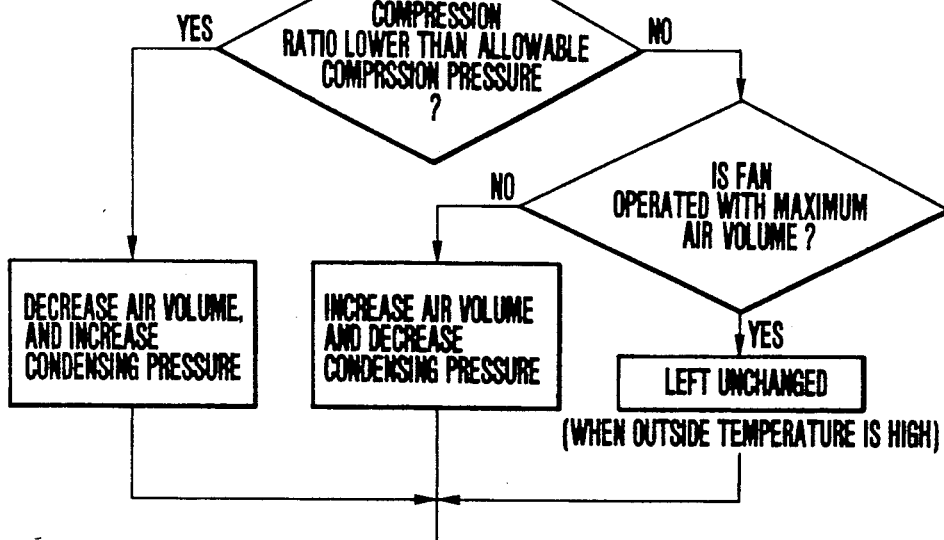

The operation method in the arrangement shown in FIG. 8 will be described with reference to the flow chart shown in FIGS. 12(a) and 12(b).

The control operation in the first process is the same as that in the arrangements shown in FIGS. 3 and 4. In a second process, if the measured degree of superheat is higher than the preset degree of superheat (Y) and the expansion valve 23 is fully opened (Y), the air volume of the fan 27 of the outdoor unit is decreased in accordance with the difference between the measured and preset degrees of superheat so as to increase the condensing pressure and to decrease the degree of superheat. Contrary to this, if the measured degree of superheat is lower than the preset degree of superheat (N) and the air volume of the fan 27 is decreased (Y) to increase the condensing pressure, the air volume of the fan 27 is increased in accordance with the difference between the measured and preset degrees of superheat, thereby decreasing the condensing pressure and increasing the degree of superheat. With this method, when the degree of superheat cannot be controlled by the expansion valve 23, the air volume of the fan 27 is controlled so as to control the degree of superheat.

In the control operation of the air volume, when the fan of the outdoor unit comprises a plurality of fans, some fans are intermittently operated.

The control of the compression ratio is the same as in the control method of the arrangements shown in FIGS. 3 and 4. When the measured compression ratio is lower than the allowable minimum compression ratio (Y), the air volume of the fan 27 is decreased in accordance with the difference between the measured compression ratio and the allowable minimum compression ratio, so that the condensing pressure is increased and the compression ratio is increased to be higher than the allowable minimum compression ratio. However, if the measured compression ratio is higher than the allowable minimum compression ratio (N) but is too higher, for example, when a compression ratio is increased to 3.0 although the allowable minimum compression ratio is 2.0, compression power becomes too high, resulting in a noneconomical operation. Thus, when the measured compression ratio is higher than the allowable minimum compression ratio, the air volume of the fan 27 is increased controlled in accordance with the difference therebetween so as to decrease condensing pressure, so that the cooling apparatus is always operated at a compression ratio near the allowable minimum compression ratio.

When the outside temperature is high, the fan 27 of the outdoor unit is operated to blow the maximum air volume.

According to the present invention as described above, the following effects can be obtained.

(1) When the cooling apparatus is operated at a low outside temperature, the condensing pressure control device is used. Thus, even when the expansion valve is fully opened so that the refrigerant circulation amount is small and the degree of superheat is high, the flow rate of the refrigerant bypassing the condenser is controlled or the air volume to the condenser is controlled so as to control the degree of superheat. In addition, the condensing pressure is suppressed to a minimum necessary pressure, thus allowing an every-saving operation.

Figure 1:
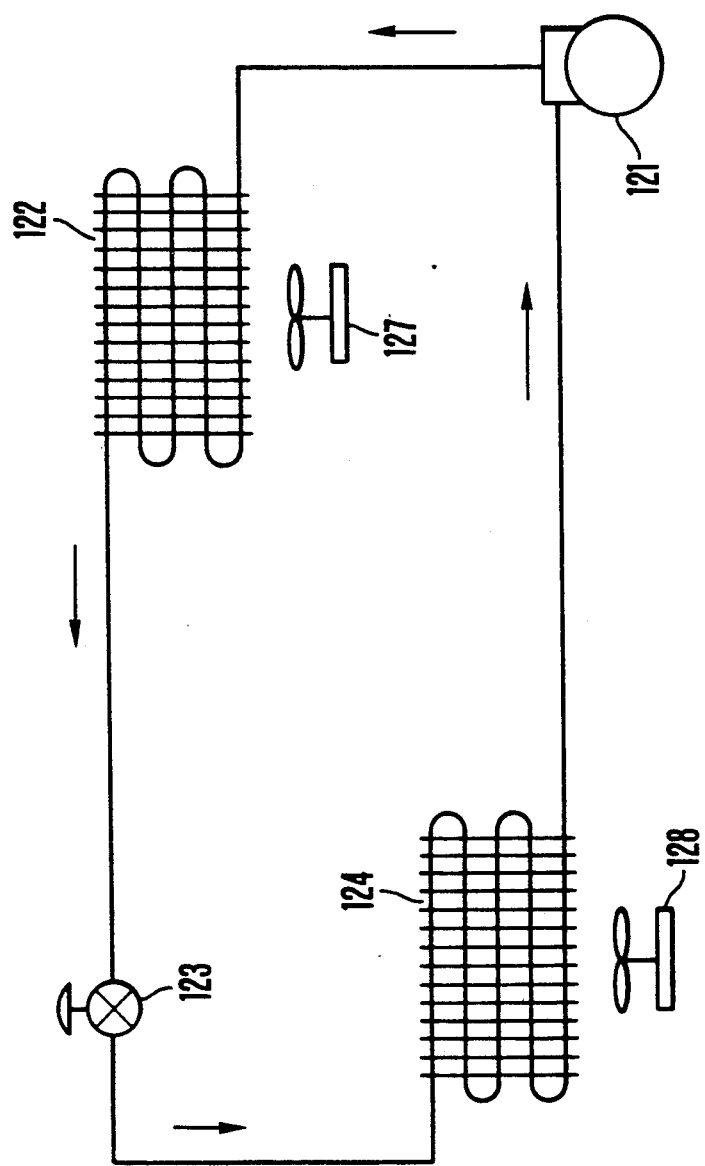
FIG. 1 is a diagram showing a basic arrangement of a cooling apparatus.
Figure 2:
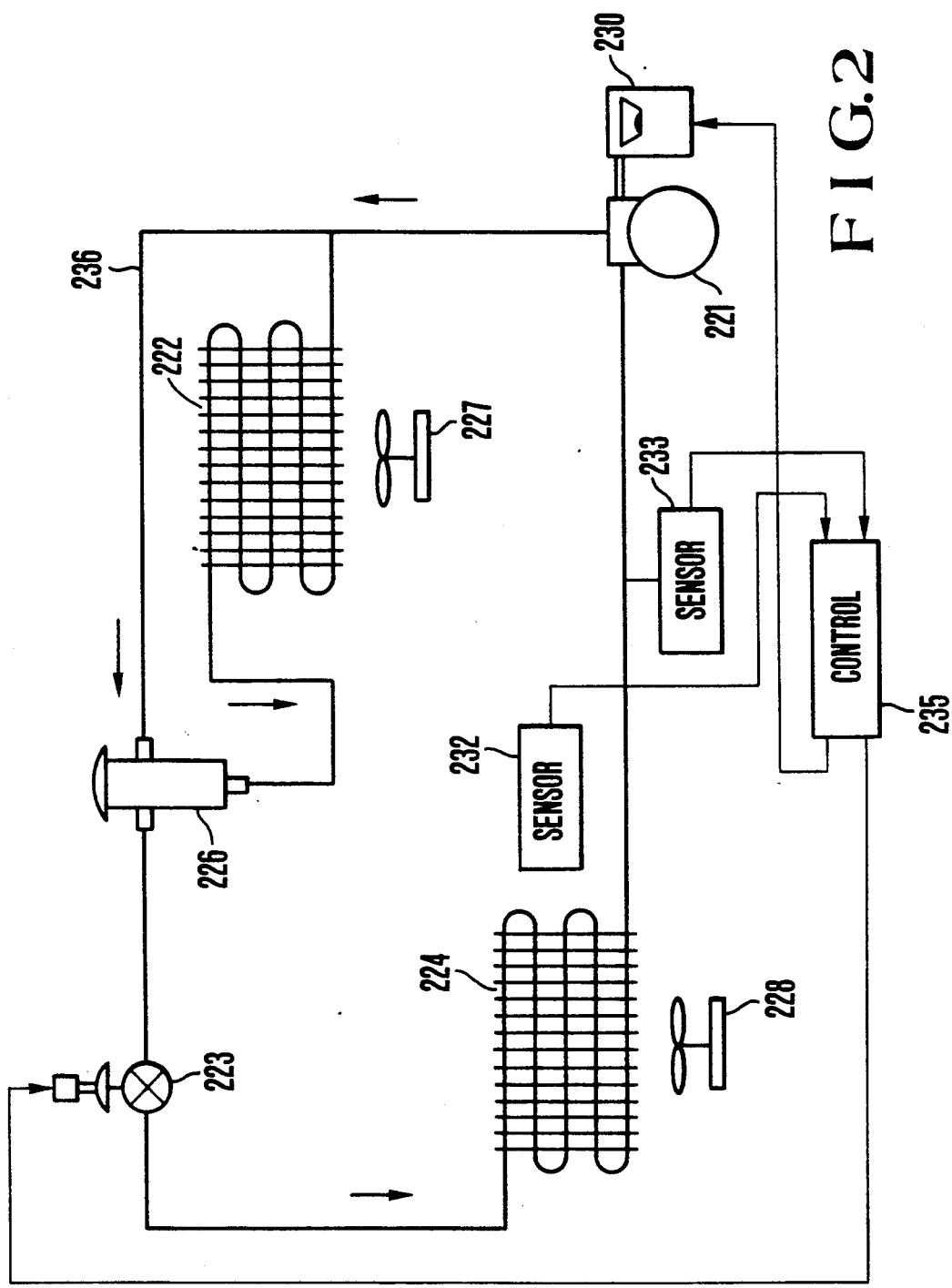
FIG. 2 is a diagram showing an arrangement of a conventional cooling apparatus.
Figure 13:
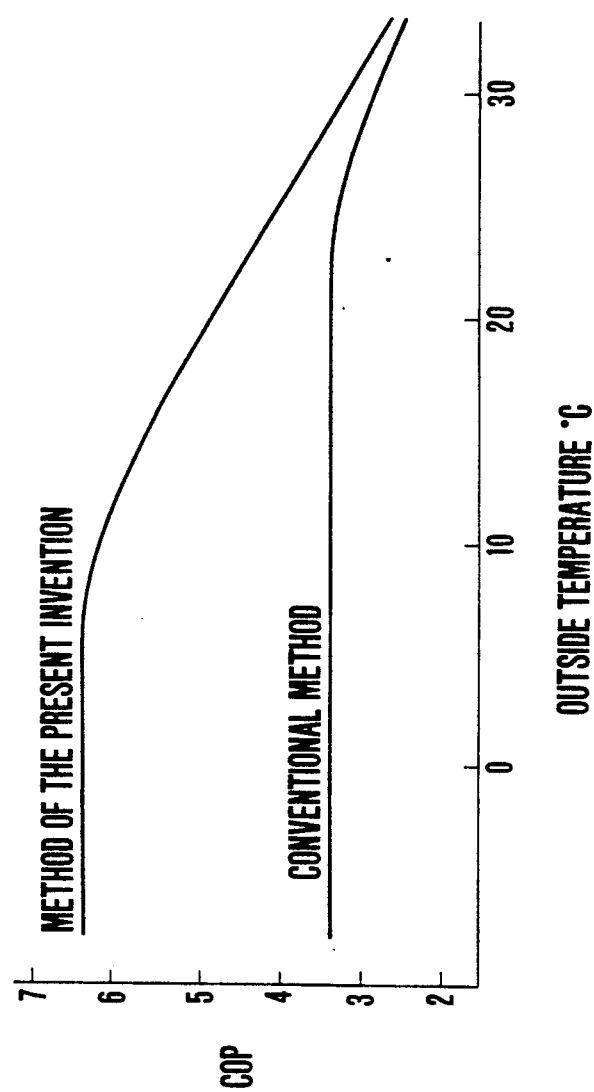
FIG. 13 is a graph comparing coefficients of performance (COPs) of a case wherein the cooling apparatus is controlled by the conventional method and a case wherein the cooling apparatus is controlled by the method of the present invention.

FIG. 13 is a graph comparing coefficients of performance (COPs) of the present invention and the prior art shown in FIG. 2. The COP is defined as follows:

$$COP = \frac{\text{Cooling Capacity of Air Conditioner [kW]}}{\text{Input Electric Power to Compressor [kW]}}$$

With the arrangement and control method of the present invention, a difference in COP significantly appears when the outside temperature is 20° C. or less. When the outside temperature is 5° C. or less, the COP becomes about 2.5 times that of the conventional method.

Figure 14:
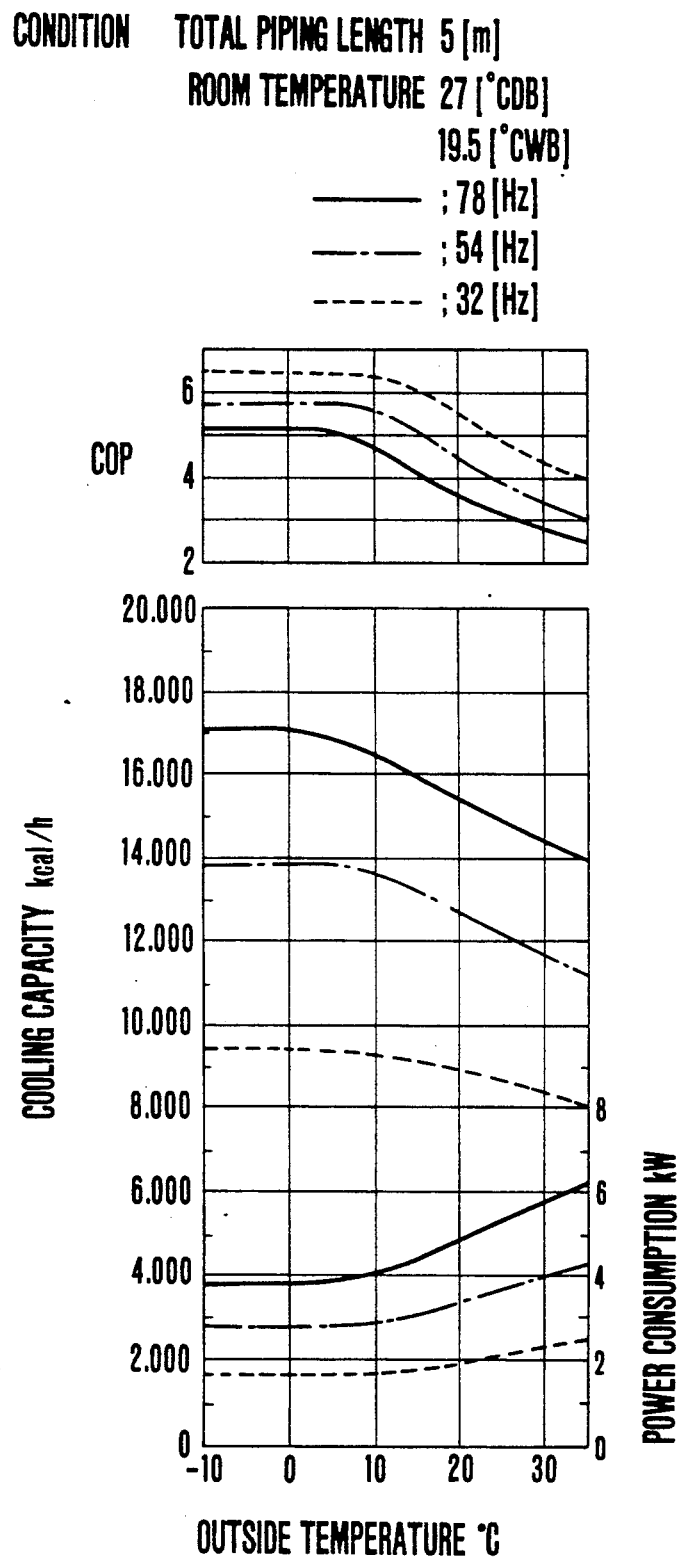
FIG. 14 is a graph showing performance of an air conditioner to which the control method of the present invention is applied.

FIG. 14 is a graph showing performance of an air conditioner to which the control method of the present invention is applied. As can be seen from FIG. 14, in the control method of the present invention, when the outside temperature is low, the cooling capacity is increased and power consumption is reduced even at an identical operation frequency of the compressor as compared to a case wherein the outside temperature is high. Thus, the operation with the large COP can be performed.

(2) When the cooling apparatus is operated at a low outside temperature, even if a ratio of a delivery pressure to a suction pressure is lower than the allowable minimum compression ratio, the flow rate of the refrigerant bypassing the condenser is controlled or the air volume to the condenser is controlled so as to set a minimum necessary condensing pressure. Thus, an energy-saving operation can be performed while protecting the compressor.

What is claimed is:

1. A cooling apparatus comprising: a compressor; a condenser; a fan of an outdoor unit for blowing said condenser; an evaporator; a fan of an indoor unit for blowing said evaporator; a path for guiding a refrigerant delivered from said compressor via said condenser; a bypass path for guiding the refrigerant while bypassing said condenser; means for controlling a flow rate ratio of said path to said bypass path; a path for guiding the refrigerant flowing out from said means for controlling the flow rate ratio toward said evaporator; an expansion valve arranged between said means for controlling the flow rate ratio and said evaporator; a path for returning the refrigerant flowing out from said evaporator toward said compressor; a compression ratio sensor for detecting a ratio of a delivery pressure to a suction pressure of said compressor; a superheat sensor for detecting a degree of superheat of the refrigerant at a suction port of said compressor; and a control unit for performing an arithmetic operation of signals from said superheat sensor and for supplying a control signal to said expansion valve and at the same time for performing an arithmetic operation of signals from said compression ratio sensor and said superheat sensor and for supplying a control signal to said means for controlling the flow rate ratio of said path via said condenser to said bypass path.

2. An apparatus according to claim 1, wherein said means for controlling the flow rate ratio comprises a variable setting pressure type condensing pressure control valve arranged at a merging point between said path via said condenser and said bypass path.

3. An apparatus according to claim 1, wherein said means for controlling the flow rate ratio comprises a first control valve arranged before a merging point between said path via said condenser and said bypass path, and a second control valve arranged in said bypass path.

4. An apparatus according to claim 1, wherein said bypass path partially passes through said condenser.

5. An apparatus according to claim 1, wherein said bypass path includes another condenser.

6. An apparatus according to claim 1, wherein said fan of the outdoor unit comprises a plurality of independently controllable fans of an outdoor unit.

7. A cooling apparatus comprising: a compressor; a condenser; a plurality of independently controllable fans of an outdoor unit for blowing said condenser; an evaporator; a fan of an indoor unit for blowing said evaporator; a path for guiding a refrigerant delivered from said compressor via said condenser; a path for guiding the refrigerant flowing out from condenser toward said evaporator; a variable valve lift expansion valve arranged in the middle of said path; a path for returning the refrigerant flowing out from said evaporator toward said compressor; a compression ratio sensor for detecting a ratio of a delivery pressure to a suction pressure of said compressor; a superheat sensor for detecting a degree of superheat of the refrigerant at a suction port of said compressor; and a control unit for performing an arithmetic operation of signals from said superheat sensor and for supplying a control signal to said variable valve lift expansion valve and at the same time for performing an arithmetic operation of signals from said compression ratio sensor and said superheat sensor and for supplying a control signal to said fans of the outdoor unit.

8. A cooling apparatus comprising: a compressor; a condenser; a fan of an outdoor unit for flowing said condenser; an evaporator; a fan of an indoor unit for blowing said evaporator; a path for guiding a refrigerant from said compressor toward said condenser; a bypass path for guiding the refrigerant while bypassing said condenser; means for controlling a flow rate ratio of said path to said bypass path; a path for guiding the refrigerant flowing out from said means for controlling the flow rate ratio toward said evaporator; an expansion valve arranged between said means for controlling the flow rate ratio and said evaporator; a path for returning the refrigerant flowing out from said evaporator toward said compressor; a compression ratio sensor for detecting a ratio of a delivery pressure to a suction pressure of said compressor; a superheat sensor for detecting a degree of superheat of the refrigerant at a suction port of said compressor; and a control unit for performing an arithmetic operation of signals from said superheat sensor and for supplying a control signal to said variable valve lift expansion valve and at the same time for performing an arithmetic operation of signals from said compression ratio sensor and said superheat sensor and for supplying a control signal to said means for controlling the flow rate ratio of said path via said condenser to said bypass path, wherein when the degree of superheat detected by said superheat sensor is higher than a preset value, said expansion valve is controlled to be opened, and when the degree of superheat is higher than the preset value after said expansion valve is fully opened, said bypass path is controlled to be opened by said means for controlling the flow rate ratio thereby decreasing the degree of superheat.

9. A method of controlling a cooling apparatus comprising: a compressor; a condenser; a plurality of independently controllable fans of an outdoor unit for blowing said condenser; an evaporator; a fan of an indoor unit for blowing said evaporator; a path for guiding a refrigerant from said compressor toward said condenser; a path for guiding the refrigerant flowing out from condenser toward said evaporator; a variable valve lift expansion valve arranged in the middle of said path; a path for returning the refrigerant flowing out from said evaporator toward said compressor; a compression ratio sensor for detecting a ratio of a delivery pressure to a suction pressure of said compressor; a superheat sensor for detecting a degree of superheat of the refrigerant at a suction port of said compressor; and a control unit for performing an arithmetic operation of signals from said superheat sensor and for supplying a control signal to said expansion valve and at the same time for performing an arithmetic operation of signals from said compression ratio sensor and said superheat sensor and for supplying a control signal to said fans of the outdoor unit, wherein when the degree of superheat detected by said superheat sensor is higher than a preset valve, said expansion valve is controlled to be opened, and when the degree of superheat is higher than the preset valve after said expansion valve is fully opened, air volumes of said fans of the outdoor unit are decreased to decrease degree of superheat.

10. A cooling apparatus comprising: a compressor; a condenser; a fan of an outdoor unit for blowing said condenser; an evaporator; a fan of an indoor unit for blowing said evaporator a path for guiding a refrigerant from said compressor toward said condenser, a bypass path for guiding the refrigerant while bypassing said condenser; means for controlling a flow rate ratio of said path to said bypass path; an expansion valve arranged between said means for controlling the flow rate ratio and said evaporator; a path for guiding the refrigerant flowing out from said means for controlling the flow rate ratio toward said evaporator; path for returning the refrigerant flowing out from said evaporator toward said compressor; a compression ratio sensor for detecting a ratio of a delivery pressure to a suction pressure of said compressor; a superheat sensor for detecting a degree of superheat of the refrigerant at a suction port of said compressor; and a control unit for performing an arithmetic operation of signals from said superheat sensor and for supplying a control signal to said expansion valve and at the same time for performing an arithmetic operation of signals from said compression ratio sensor and said superheat sensor and for supplying a control signal to said means for controlling the flow rate ratio of said path via said condenser to said bypass path, wherein when a compression ratio as a ratio of a delivery pressure to a suction pressure of said compressor becomes lower than an allowable minimum compression ratio, said bypass path is controlled to be opened by said means for controlling the flow rate ratio, so that the compression ratio becomes higher than the allowable minimum compression ratio.

11. A method of controlling a cooling apparatus comprising: a compressor; a condenser; a plurality of independently controllable fans of an outdoor unit for blowing said condenser; an evaporator; a fan of an indoor unit for blowing said evaporator; a path for guiding a refrigerant from said compressor toward said condenser; a path for guiding the refrigerant flowing out from condenser toward said evaporator; an expansion valve arranged in the middle of said path; a path for returning the refrigerant flowing out from said evaporator toward said compressor; a compression ratio sensor for detecting a ratio of a delivery pressure to a suction pressure of said compressor; a superheat sensor for detecting a degree of superheat of the refrigerant at a suction port of said compressor; and a control unit for performing an arithmetic operation of signals from said superheat sensor and for supplying a control signal to said variable valve lift expansion valve and at the same time for performing an arithmetic operation of signals from said compression ratio sensor and said superheat sensor and for supplying a control signal to said fans of the outdoor unit, wherein when a compression ratio as a ratio of a delivery pressure to a suction pressure of said compressor becomes lower than an allowable minimum compression ratio, air volumes of said fans of the outdoor unit are decreased so that the compression ratio becomes higher than the allowable minimum compression ratio.

* * * * *